Figure 5:
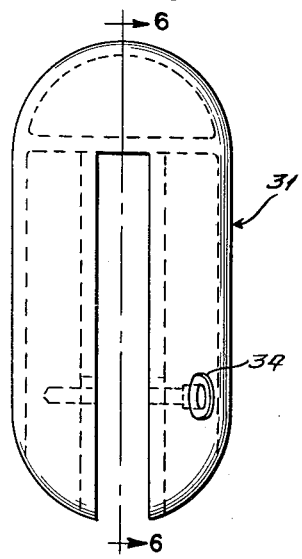

June 19, 1956   J. T. JONES   2,751,124
DISPENSING MACHINE FOR SOFT OR SEMI-FLUID MATERIALS
Filed Oct. 23, 1950   2 Sheets-Sheet 1
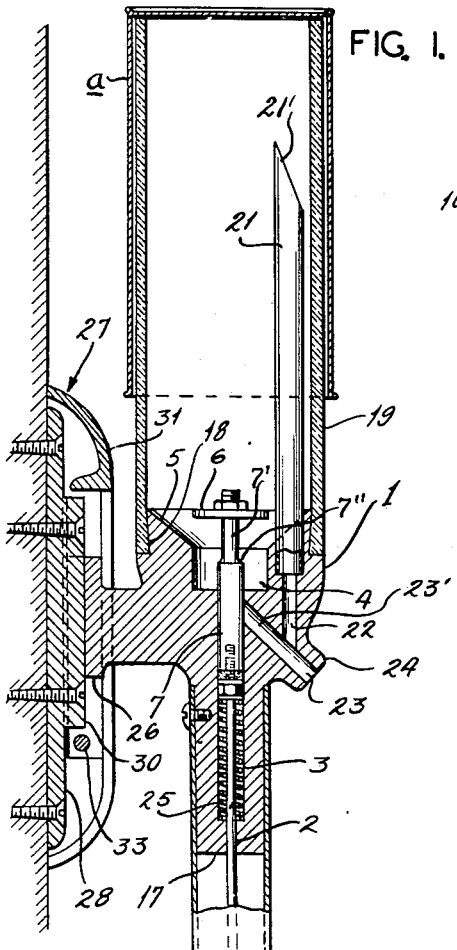
FIG. 1.
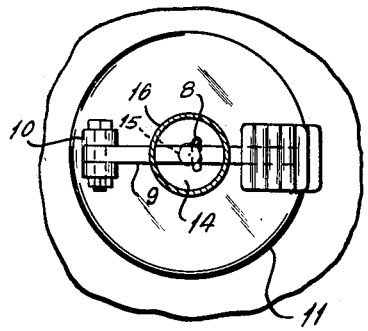
FIG. 2.
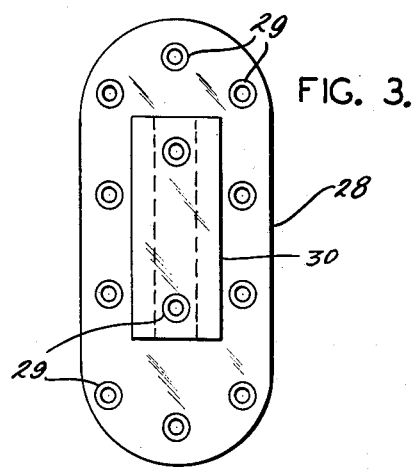
FIG. 3.
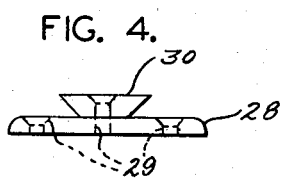
FIG. 4.
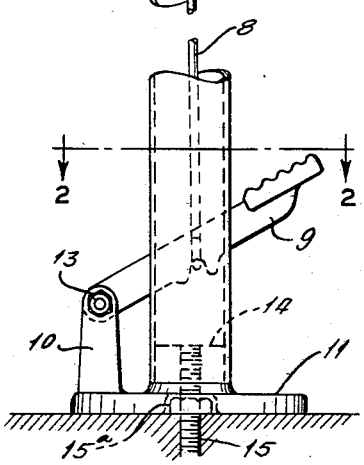
INVENTOR
JAMES T JONES
BY *Alfred F. Rees*
ATTORNEY June 19, 1956 J. T. JONES 2,751,124
DISPENSING MACHINE FOR SOFT OR SEMI-FLUID MATERIALS
Filed Oct. 23, 1950 2 Sheets-Sheet 2

INVENTOR
JAMES T. JONES

BY *Alfred F. Dees*

ATTORNEY

United States Patent Office 2,751,124
Patented June 19, 1956

2,751,124

DISPENSING MACHINE FOR SOFT OR SEMI-FLUID MATERIALS

James T. Jones, Maplewood, Mo.

Application October 23, 1950, Serial No. 191,604

8 Claims. (Cl. 222—179)

This invention relates to dispensing machines and is more particularly directed to a machine for dispensing a soft semi-fluid soap, hand cleaner or emulsion.

The primary object of this invention is to provide a machine that will dispense a semi-fluid hand cleaner supplied in cylindrical cans, without first removing the contents from the cans to fill the machine, and which utilizes a can, inverted, as a telescoping part of the apparatus for dispensing the contents thereof.

Another object is to supply a dispensing machine with unique air-vent provisions which make possible the filling of a dispensing machine by such a semi-fluid substance by merely pressing an open, inverted can thereover.

A further object is to make provisions for the admission of air to a piston-operated dispensing machine having a telescoping top after the contents of such machine have been lowered to a level below the minimum telescoping height, and to avoid expulsion of any of the contents on the return stroke of the piston.

The invention consists in the provision of a standard having a cylinder bore in its upper end in which a piston is slidably mounted, the piston being actuated by a manually operated lever and returned by a spring, the material to be dispensed flowing by gravity and vacuum into the cylinder bore, the piston when forced into the bore causing material to be ejected through a passage connected thereto, the material in the passage being drawn back into the bore during the return stroke of the piston so that it will not be exposed to atmosphere.

Figure 6:
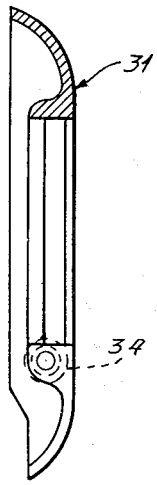
Figure 8:
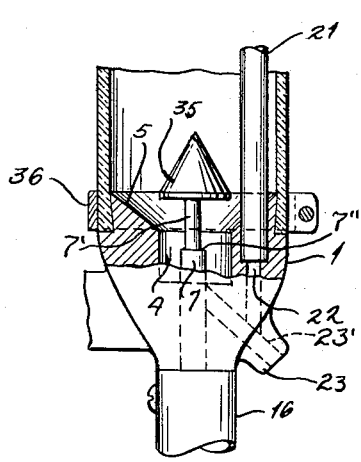
Figure 7:
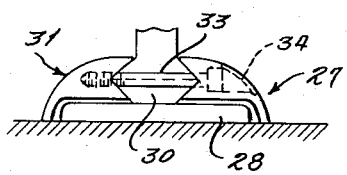

In the drawings:

Fig. 1 is a sectional elevational view of a dispensing machine embodying the invention, Fig. 2 is a sectional view taken substantially along the line 2—2 of Fig. 1, Fig. 3 is a plan view of the wall bracket for the dispenser shown in Fig. 1, Fig. 4 is an end elevational view of the bracket shown in Fig. 1, Fig. 5 is a plan view of the clamp for the wall bracket, Fig. 6 is a sectional view of the clamp taken substantially along the line 6—6 of Fig. 5, Fig. 7 is an end view of the assembled clamp and bracket, Fig. 8 is a sectional elevational view of a portion of the dispenser shown in modified form.

The body 1 is penetrated by a vertical bore 2 of relatively small diameter, the upper end of which is coaxially counterbored and progressively enlarged by a rod-receiving counterbore 3, a cylinder bore 4, and a funnel-like tapered bore 5 which leads into the cylinder bore 4, the latter thereby serving as an operating sump for the dispensing machine. A disc-like piston 6 is slidably received within the cylinder bore 4, being mounted onto the upper end of a piston rod 7 which is adapted for reciprocation within the rod-receiving counterbore 3 and is of but slightly smaller diameter. However, beneath the piston 6 and extending for a length greater than the depth of the cylinder bore 4, the piston rod 7 has a necked-down portion 7' of substantially lesser diameter than that of the rod-receiving portion 3, whereby to provide an annular flow passage as hereinafter described. The necked-down portion 7' joins the remainder of the rod 7 at an annular shoulder referred to as the valving shoulder 7". The length of the necked-down portion 7' between the piston 6 and the valving shoulder 7" is somewhat greater than the depth of the cylinder bore 4.

The piston rod 7 has at its lower end an actuating rod 8 threaded therein, which extends downward through a coiled restoring spring 25 seated in the bottom of the counterbore 3, and hooks at its lower end about an actuating lever 9 pivoted to a bracket 10 integral with a foot 11 for the machine. The hook on rod 8 is disposed between two downwardly extending projections formed on the lower side of the lever 9. A suitable pin is inserted in the bracket about which the lever pivots. The foot 11 has a boss 14 on its upper side and an adjusting screw 15 is threaded into the foot and boss and is also adapted to be threaded into a lock nut 15a set in the floor and in addition functions as a stop for limiting the downward movement of the lever 9. The lock nut 15a serves as an anchor thus securing the foot of the machine. The adjusting screw 15 further serves as a mechanism for regulating the amount of material to be dispensed or metered as required by the user and also prevents damage to the piston such as by a powerful downstroke of the lever 9. Upstrokes are actuated by the restoring spring 25 whose extended height is sufficient to raise the piston 6 out of the upper end of the cylinder bore 4, permitting material within the funnel-like tapered bore 5 to be displaced downward within the cylinder bore 4.

A tube 16 is arranged between the body 1 and the foot 11, it being snugly fitted about projection 14 and projection 17 on the foot and body respectively. The tube constitutes a standard for the machine and disposes it a convenient distance above the floor. Suitable retaining means are provided between the tube and the two projections for the purpose of preventing separation thereof.

The body portion has a portion machined therefrom as at 18. This is an outwardly or reversely tapered cut of about two degrees and cooperates with a similarly or complementally interiorly tapered surface in a transparent tapered plastic tubular open-top container 19. The diameter of the plastic container 19 is made a little smaller than the diameter of the tapered portion of the body member. The plastic container 19 is then heated for the purpose of expanding it and when its diameter is large enough the plastic container is fitted over the tapered portion of the body and then allowed to cool and shrink onto the body 1. Experience has proven this to be a leak proof as well as mechanically strong connection in addition to being much more economical than other types of joints.

A receptacle a containing a waterless type of hand cleaner is inverted and slipped over the open-top container 19. Gravitational action forces the contents of the receptacle a into the container 19. The same action also causes the cleaner to fill the cylinder bore 4. Air is vented to the space above the cleaner through a tube 21 connected to a vertical vent passage or duct 22 formed in the body 1. This vent passage 22 terminates at its lower end within a slanting discharge passage 23' which leads outward from the counterbore 3 from a level therein just below the bottom of the cylinder bore 4, to a discharge nozzle 23 formed on body 1. The tube 21 is arranged vertically inside the container and its upper end is cut on a taper to provide an elongated, outward-facing upper vent passage opening 21', with a pointed upper end which readily penetrates the material to be dispensed.

When the container 19 has been substantially filled by the contents of a first receptacle, it is intended that the first receptacle be removed and a second full receptacle be inverted and placed over the upper end of the container 19 and pushed downward thereon, driving air out through the tube 21. The contents of the receptacle will hold it above the position shown in Figure 1 until enough has been drawn off from the container to permit the gradual telescoping of the receptacle into the position shown in Figure 1.

The material to be dispensed has a consistency approximating lard at 60° F. The clearance between the telescoping container and receptacle varies from 0.003 inch up to 0.056 inch which allows the two members to telescope, prevents air passing between them thereby avoiding deterioration of the cleaner by oxidation and liquidation and dripping from the nozzle thus preserving the cleaner at its proper consistency. When clearance exceeds the maximum limit the cleaner is not preserved and when clearance is less the receptacle and container bind as well as interfering with gravitational and vacuum action on the cleaner and receptacle.

After the cleaner has filled the cylinder bore 4 it is ready to be dispensed therefrom. The lever 8 is depressed which pulls piston 6 into the cylinder bore 4, and lowers the valving shoulder 7" of the piston rod 7 below the level of the inner end of the discharge passage 23', thus pushing the contents from the bore 4 into the annular space between the wall of the counterbore 3 and the necked-down portion 7' of the rod 7, thence through the discharge passage 23' and then out of the discharge nozzle 23. When the lever 8 is depressed spring 25 is energized by compressing same and when the lever is released the spring returns the piston to the position shown in Fig. 1. During this upstroke a sub-atmospheric pressure is created in the cylinder bore below the piston 6 and air entering the nozzle 23 will carry along with it any cleaner that may be therein. As cleaner again fills the cylinder bore the space between the top of the cleaner in container 19 and the closed end of receptacle 20 will be gradually lowered by telescoping of the receptacle on the container 2 until the receptacle lowers to the position shown in Figure 1. If the receptacle is not then replaced by a new full receptacle, as the contents of the container 2 are further drawn off, the receptacle will be kept filled with air drawn largely through tube 21 although some may enter the space by passing between the receptacle and the container. The dispenser is now in condition for the next operation.

The body 1 has a dovetailed bracket integrally associated therewith. This cooperates with a combination wall bracket and clamp 27. This device comprises a plate 28 provided with a plurality of apertures 29 through which screws may extend threaded into expansion nuts set in a masonry or other type wall. Other means of securing the plate to the wall may be employed and the reason for the large number of holes 29 is that at least two of them will line up with mortar joints in the event the plate is to be secured to a brick wall. The plate has a dovetailed projection 30 thereon that abuts against the dovetail portion of the bracket 26. A U clamp 31 is provided with a V groove in each leg thereof in which the abutted dovetail portions are received. A screw 33 extended through one leg of the clamp is threaded into the other leg. When the screw is turned home or tightened the legs of the U clamp are drawn towards each other so that the V grooves force the dovetailed portions together and therefor tightly clamp the parts together into a rigid structure. A welch plug (not shown) is fitted into the aperture 34. The U clamp is suitably contoured for the purpose of covering the plate 28 thus causing it to present a neat appearance.

Fig. 8 is a view showing the upper part of a device similar to that shown in Fig. 1 in which the same parts bear the same reference numerals. The piston 35 is cone shaped. The apex of the cone points upwardly into the cleaner for facilitating movement thereof into the cylinder bore by reducing resistance to piston movement thus increasing the vacuum in the bore thereby causing it to be more rapidly filled. The length of the vent tube 21 and its tapered or slanted end is proportioned the same as in Fig. 1. A clamp 36 is placed about the container 19 about the reverse taper thereon for aiding in locking the receptacle thereto. The action of this device is identical to that described above. The clamp and cone shaped piston may be applied to the Fig. 1 disclosure if so desired.

Attention is directed to certain specific problems attendant to dispensing semi-fluid substances. Unlike true fluids, such substances cannot be poured into a dispenser. If the receptacle in which such a substance is furnished be inverted over the container of the dispenser, the dispenser cannot be vented upward. Without an air vent outlet, it would be impossible to force the semi-fluid substance into the dispenser's container.

Additional problems arise after the dispenser's container has been filled. Utilizing an inverted receptacle telescopingly over the dispenser, there is no air space above the dispenser's contents until the level of contents within the dispenser's container has dropped below the level of telescoping. Thereafter, there must be an air space over the contents, and consequently an air vent inlet. But if the return stroke of the dispenser piston forces out some air through the vent, it may also exude or splatter out a small amount of the semi-fluid substance.

The unique air vent means herein provided solves all of these problems. It is intended that the container 19 will normally be refilled when the level of the contents drops to approximately the level of the tapered end opening 21' of the vent tube 21. When a receptacle $a$ is inverted and pressed in place over the container 19 the air in the partly-filled container 19 is forced out through the end opening 21' and vent tube 21 through the vertical vent passage 22 and out the nozzle 23. If, however, the level of the contents of the container 19 be substantially below the tapered end opening 21', and a first filled receptacle $a$ be pressed all the way down over the container 19, a small quantity of semi-fluid substance will be forced out through the vent tube 21 and discharged from the nozzle 23. This loss is not desirable, but it is too small to be seriously disadvantageous; and since it proceeds from the discharge nozzle 23 it is less objectionable than if there were an undesired discharge from some vent not associated with the discharge nozzle.

Such receptacle may be removed by lifting it upwards, first closing the discharge nozzle 23 with a finger-tip. A second filled receptacle may be inverted and placed over the container 19, any air between its contents and those of the container 19 being expelled through the vent tube 21 by downward pressure; and such second receptacle may then be left in elevated position, to telescope gradually downward over the outer wall of the container 19, under pressure of the atmosphere, as the contents of the container 19 are gradually dispensed.

After a receptacle has lowered to the position shown in Figure 1, air must be admitted to the container 19 to make possible further discharge of the container contents. Whenever the piston 6 shown in Figure 1 (or the piston 35 of Figure 8) is raised, the air space within the container 19 will be lessened. Should air be admitted to fill the container 19 when the piston 6 is lowered by a discharge stroke, the amount of air so admitted would be too great. The return piston stroke would force out the excess air, and some of the semi-fluid contents might splatter out with it.

I solve this problem by having the lower end of the vent passage 22 communicate with the discharge passage 23', which is filled with semi-fluid substance on the discharge stroke of the piston but emptied by the upstroke of the piston. Air cannot enter the vent duct 22 through the nozzle 23 as long as the discharge passage 23' is so filled. Therefore, the entrance of air is delayed until the upstroke of the piston 6, and the amount of air which then enters is limited to the amount necessary to replace the contents which were discharged by the downstroke.

That which is regarded new, novel and useful and which is sought to be protected by Letters Patent of the United States is as follows:

1. A dispenser for semi-fluid substances comprising a vessel, a sump in the base thereof, a bore through the base of the sump, a discharge nozzle having a first passage communicating with said bore and a second passage affording communication between said first passage and the upper portion of said vessel, a shaft operable in and along the axis of said bore, a piston on said shaft adapted to be drawn thereby from within the vessel downward into and toward the base of the sump, and to be returned thereby upward to and above the top of the sump, the shaft having a valving portion subjacent the piston serving to close the bore when the piston is raised above the top of the sump and to establish flow communication through the bore between the sump and said first passage when the piston is within the sump, a column supporting the vessel and enclosing the shaft beneath the sump, and pedal means operatively connected to said shaft for lowering and raising the shaft within the bore.

2. A dispenser for semi-fluid substances comprising a vessel, a cylindrical sump in the base thereof, a bore through the base of the cylindrical sump, a discharge nozzle having a first passage communicating with said bore and a second passage affording communication between said first passage and the upper portion of said vessel, a shaft operable in and along the axis of said bore, a piston on said shaft, the principal diameter of the shaft fitting slidingly within said bore and being adapted to close it when the piston is raised above the top of the sump, a segment of the shaft subjacent the piston having a reduced cross-sectional area and being of such depth as to establish flow communication through the bore between said first passage and the sump when the piston is within the sump, and means operatively connected to said shaft for drawing the piston into and toward the base of the sump thereby discharging its contents through said first passage, and for returning the piston upward to the top of the sump, thereby sucking the contents remaining in the passage back into the sump, and for raising the piston above the top of the sump, whereby the contents of the vessel are permitted to flow into the sump.

3. A dispenser for semi-fluid substances comprising a cylindrical open-top vessel, a cylindrical sump in the base thereof, a bore through the base of the cylindrical sump, a discharge nozzle having a first passage communicating with said bore and a second passage affording communication between said first passage and the upper portion of said vessel, a shaft operable in and along the axis of said bore, a piston on said shaft adapted to be drawn thereby from within the vessel downward into and toward the base of the sump, and to be returned thereby upward to and above the top of the sump, the shaft having a valving portion subjacent the piston serving to close the bore when the piston is raised above the top of the sump and to establish flow communication through the bore between the sump and the said first passage when the piston is within the sump, a cylindrical receptacle adapted to be inverted over and positioned in telescoping relationship to said open-top vessel when said vessel and receptacle are filled with such a semi-fluid substance and to be drawn downward telescopingly as the contents of the vessel are gradually discharged, and means operatively connected with the shaft for drawing the piston into and toward the base of the sump thereby discharging its contents through said first passage, and for returning the piston upward and raising it above the top of the sump whereby the contents of the vessel are urged to flow into the sump.

4. A dispenser for semi-fluid substances as defined in claim 3, together with an air vent tube extending upward into said vessel and communicating at its lower end with said second passage to said discharge nozzle whereby air is admitted to permit continued discharge of such semi-fluid substances from the vessel after the receptacle is lowered so that its base contacts the top of the vessel.

5. A dispenser for semi-fluid substances comprising a vessel, a sump in the base thereof, a bore through the base of the sump, a discharge nozzle having a first passage communicating with said bore and a second passage affording communication between said first passage and the upper portion of said vessel, a shaft operable in and along the axis of said bore, a piston on said shaft, the shaft having a valving portion subjacent the piston and serving to close off said first passage when the piston is raised and to establish flow communication through the bore between the sump and said first passage when the piston is lowered, and means operatively connected with the shaft for drawing the piston toward the base of the sump whereby its contents are discharged into and through said first passage, and for returning the piston upward whereby the contents of the vessel are permitted to flow into the sump.

6. A dispenser adapted to dispense semi-fluid substances furnished in cylindrical cans from such cans which have been opened by removal of their tops, comprising an open-top cylindrical vessel having an outer diameter slightly less than the inner diameter of such can, whereby such can so opened and containing such semi-fluid substance may be inverted and pressed telescopingly in place over the vessel, further comprising a vessel base having a vented tube extending upward therein, a reciprocating discharge piston, operating mechanism therefor operatively connected therewith, a discharge bore associated therewith, and a discharge nozzle having a first passage communicating with said discharge bore and a second passage communicating between said first passage and said vented tube, whereby on inverting such opened can filled with such semi-fluid substance, placing it in position telescopingly atop said vessel, and pressing it downward, air within said vessel beneath the semi-fluid contents of such can is driven out through said vented tube, said second passage, and said discharge nozzle, permitting such semi-fluid substance to descend toward the base of the vessel.

7. A dispenser adapted to dispense semi-fluid substances furnished in cylindrical cans from such cans which have been opened by removal of their tops, comprising an open-top cylindrical vessel having an outer diameter slightly less than the inner diameter of such can, whereby such can so opened and containing such semi-fluid substance may be inverted and pressed telescopingly in place over the vessel, further comprising a vessel base having a vented tube extending upward therein, and communicating through the base to vent to the atmosphere, a reciprocating discharge piston in said base, operating mechanism operatively connected therewith, a discharge bore associated therewith, a discharge nozzle communicating with said discharge bore, and a vent communicating between the base of said vented tube and the exterior, whereby on inverting such opened can filled with such semi-fluid substance, placing it in position telescopingly atop said vessel, and pressing it downward, air within said vessel beneath the semi-fluid contents of such inverted can is driven out through said vented tube and vent, whereafter on operating said piston the pressure of the atmosphere causes such inverted can to descend progressively with its sides telescopingly outward of said vessel until the bottom of such can contacts the upper portion of said vessel.

8. A reciprocating piston-type dispenser adapted to dispense semi-fluid substances furnished in cylindrical cans from such cans which have been opened by removal of their tops, comprising a cylindrical vessel having an open top including a smooth upper margin and having an outer diameter slightly less than the inner diameter of such can, whereby such can so opened and containing such semi-fluid substance may be inverted and pressed telescopingly in place over the vessel and descend until the bottom of such can closes against said upper margin, further comprising a vessel base having a vented tube extending upward therein, a reciprocating discharge piston, operating mechanism therefor operatively connected therewith, a discharge bore associated therewith, and a discharge nozzle having a first passage communicating with said discharge bore and a second passage communicating between said first passage and said vented tube, the first passage being filled with such semi-fluid substance by each discharge stroke of said piston and emptied by each return stroke thereof, whereby, after such can bottom closes against the upper margin of the vessel, entrance of air to compensate for the discharge of contents on a discharge stroke will be delayed until the following return stroke.

References Cited in the file of this patent

UNITED STATES PATENTS

| Number | Name | Date |
|---|---|---|
| 98,986 | Mary | Jan. 18, 1870 |
| 185,002 | Weber et al. | Dec. 5, 1876 |
| 671,486 | Laumann | Apr. 9, 1901 |
| 813,537 | Townsend | Feb. 27, 1906 |
| 922,453 | Burgner | May 25, 1909 |
| 984,159 | Rohowitz | Feb. 14, 1911 |
| 1,159,605 | Sprague | Nov. 9, 1915 |
| 1,219,364 | Wise | Mar. 13, 1917 |
| 1,501,068 | Schatz | July 15, 1924 |
| 1,638,456 | Pike | Aug. 9, 1927 |
| 1,676,851 | Bloodhart | July 10, 1928 |
| 1,757,736 | Pritchard | May 6, 1930 |
| 1,801,396 | Thatcher | Apr. 21, 1931 |
| 1,919,455 | Wilson | July 25, 1933 |
| 1,938,181 | Holmes | Dec. 5, 1933 |
| 2,000,167 | Forman | May 7, 1935 |
| 2,009,743 | Morlok | July 30, 1935 |
| 2,170,182 | Anthony | Aug. 22, 1939 |
| 2,269,847 | Feinson | Jan. 13, 1942 |
| 2,427,335 | Antonia et al. | Sept. 16, 1947 |
| 2,445,130 | Turner | July 13, 1948 |
| 2,477,014 | Stanley et al. | July 26, 1949 |
| 2,584,167 | Sundholm | Feb. 5, 1952 |

FOREIGN PATENTS

| Number | Country | Date |
|---|---|---|
| 7,936 | Great Britain | Mar. 26, 1912 |
| 61,719 | Norway | Nov. 13, 1939 |